United States Patent
Green et al.

(10) Patent No.: US 10,986,379 B2
(45) Date of Patent: Apr. 20, 2021

(54) CONTENT MANAGEMENT AND PROVISIONING SYSTEM

(71) Applicant: WIDEORBIT LLC, San Francisco, CA (US)

(72) Inventors: Robert D. Green, Seattle, WA (US); John W. Morris, Washougal, WA (US); James M. Kott, Kirkland, WA (US); Brian S. Bosworth, Edgewater, MD (US)

(73) Assignee: WIDEORBIT LLC, San Francisco, CA (US)

( * ) Notice: Subject to any disclaimer, the term of this patent is extended or adjusted under 35 U.S.C. 154(b) by 0 days.

(21) Appl. No.: 15/580,593

(22) PCT Filed: Jun. 7, 2016

(86) PCT No.: PCT/US2016/036190
§ 371 (c)(1),
(2) Date: Dec. 7, 2017

(87) PCT Pub. No.: WO2016/200793
PCT Pub. Date: Dec. 15, 2016

(65) Prior Publication Data
US 2018/0176616 A1 Jun. 21, 2018

Related U.S. Application Data

(60) Provisional application No. 62/172,693, filed on Jun. 8, 2015.

(51) Int. Cl.
*H04N 21/234* (2011.01)
*H04N 21/235* (2011.01)
(Continued)

(52) U.S. Cl.
CPC ..... *H04N 21/23424* (2013.01); *H04N 21/233* (2013.01); *H04N 21/235* (2013.01);
(Continued)

(58) Field of Classification Search
CPC ........... H04N 21/23424; H04N 21/233; H04N 21/2335; H04N 21/6125; H04N 21/812;
(Continued)

(56) References Cited

U.S. PATENT DOCUMENTS 5,351,135 A 9/1994 Saeger
6,263,507 B1 * 7/2001 Ahmad ............ G06F 17/30787
707/E17.028
(Continued)

FOREIGN PATENT DOCUMENTS

WO 2007/056532 A1 5/2007
WO 2010/112072 A1 10/2010
(Continued)

OTHER PUBLICATIONS

"Alarm-Allocation," *Microsoft Computer Dictionary*, Fifth Edition, Microsoft Press, 2002, p. 23.
(Continued)

*Primary Examiner* — Michael R Telan
(74) *Attorney, Agent, or Firm* — Seed Intellectual Property Law Group LLP

(57) ABSTRACT

Systems and methods for content and program type detection, including identification of true boundaries between content segments. A broadcast provider sends a broadcast as an encoded stream. During a switch between content types, an automation system sends identifying metadata indicative of an approximate boundary between content types. A mediacast generation system receives the encoded stream of content and metadata, processes the metadata, time corrects the metadata, and slices the content on the exact boundary
(Continued)

where the content change occurs. The mediacast generation system decodes an audio stream directly into Waveform Audio File Format (WAVE) while using an envelope follower to measure amplitude. When the system detects a metadata marker, an analyzer may look inside a buffered time window. The WAVE data may be analyzed to look for a period most likely to be the true boundary or split point between content segments. The content may then be split up on the new true boundary.

22 Claims, 6 Drawing Sheets

(51) Int. Cl.
  H04N 21/845    (2011.01)
  H04N 21/233    (2011.01)
  H04N 21/61     (2011.01)
  H04N 21/81     (2011.01)
(52) U.S. Cl.
  CPC ..... *H04N 21/2335* (2013.01); *H04N 21/6125* (2013.01); *H04N 21/812* (2013.01); *H04N 21/8455* (2013.01); *H04N 21/8456* (2013.01)
(58) Field of Classification Search
  CPC ........... H04N 21/8455; H04N 21/8456; H04N 21/235
  See application file for complete search history.

(56) References Cited

U.S. PATENT DOCUMENTS

| | | | |
|---|---|---|---|
| 6,487,721 B1 | 11/2002 | Safadi | |
| 6,577,716 B1 | 6/2003 | Minter et al. | |
| 7,412,714 B2 | 8/2008 | Kitayama | |
| 7,676,405 B2 | 3/2010 | Steelberg et al. | |
| 7,747,769 B1 | 6/2010 | Kearns et al. | |
| 7,752,642 B2 | 7/2010 | Lemmons | |
| 7,925,774 B2 | 4/2011 | Zhang et al. | |
| 7,979,877 B2 | 7/2011 | Huber et al. | |
| 8,230,037 B2 | 7/2012 | Story et al. | |
| 8,387,102 B1 | 2/2013 | Roberts et al. | |
| 8,700,792 B2 | 4/2014 | Hughes et al. | |
| 8,812,637 B2 | 8/2014 | Cragun et al. | |
| 8,819,754 B2 | 8/2014 | Virdi et al. | |
| 8,893,208 B2 | 11/2014 | Ma et al. | |
| 8,898,717 B1 | 11/2014 | Labrozzi et al. | |
| 9,032,456 B2 | 5/2015 | Pierson et al. | |
| 9,313,359 B1* | 4/2016 | Stojancic | H04N 1/32 |
| 2001/0023498 A1 | 9/2001 | Cosmao et al. | |
| 2002/0078443 A1 | 6/2002 | Gadkari et al. | |
| 2003/0028873 A1 | 2/2003 | Lemmons | |
| 2003/0033157 A1 | 2/2003 | Dempski et al. | |
| 2003/0037068 A1 | 2/2003 | Thomas et al. | |
| 2003/0188320 A1 | 10/2003 | Shing | |
| 2004/0025176 A1 | 2/2004 | Franklin et al. | |
| 2004/0073916 A1 | 4/2004 | Petrovic et al. | |
| 2004/0088726 A1 | 5/2004 | Ma et al. | |
| 2004/0128682 A1 | 7/2004 | Liga et al. | |
| 2004/0133467 A1 | 7/2004 | Siler | |
| 2007/0074243 A1 | 3/2007 | Verhaegh et al. | |
| 2007/0157228 A1 | 7/2007 | Bayer et al. | |
| 2007/0220411 A1 | 9/2007 | Hauser | |
| 2008/0120638 A1 | 5/2008 | King et al. | |
| 2008/0195938 A1 | 8/2008 | Tischer et al. | |
| 2009/0031037 A1 | 1/2009 | Mendell et al. | |
| 2009/0060458 A1 | 3/2009 | Bauchot et al. | |
| 2010/0134691 A1* | 6/2010 | Takao | G11B 27/034 348/701 |
| 2010/0162344 A1* | 6/2010 | Casagrande | H04N 5/91 725/137 |
| 2010/0223314 A1 | 9/2010 | Gadel et al. | |
| 2010/0269138 A1 | 10/2010 | Krikorian et al. | |
| 2010/0280889 A1 | 11/2010 | Gabriel et al. | |
| 2010/0293046 A1 | 11/2010 | Cooke et al. | |
| 2011/0145370 A1 | 6/2011 | Nieuwenhuys | |
| 2012/0096486 A1 | 4/2012 | Stallard et al. | |
| 2012/0116883 A1 | 5/2012 | Asam et al. | |
| 2012/0184202 A1 | 7/2012 | Gadoury | |
| 2012/0192222 A1 | 7/2012 | Kumar et al. | |
| 2012/0293522 A1 | 11/2012 | Ahmad et al. | |
| 2013/0031582 A1 | 1/2013 | Tinsman et al. | |
| 2013/0132997 A1 | 5/2013 | King et al. | |
| 2013/0144723 A1 | 6/2013 | Green et al. | |
| 2013/0198328 A1 | 8/2013 | Green et al. | |
| 2013/0246567 A1 | 9/2013 | Green et al. | |
| 2013/0275611 A1 | 10/2013 | Somekh et al. | |
| 2013/0282495 A1 | 10/2013 | Gilbane et al. | |
| 2014/0068648 A1 | 3/2014 | Green et al. | |
| 2014/0109136 A1 | 4/2014 | Evans et al. | |
| 2014/0149596 A1 | 5/2014 | Emerson, III | |
| 2014/0150019 A1 | 5/2014 | Ma et al. | |
| 2014/0223475 A1 | 8/2014 | McIntire et al. | |
| 2014/0280746 A1 | 9/2014 | Johns | |
| 2014/0325030 A1 | 10/2014 | Maharajh et al. | |
| 2015/0067722 A1 | 3/2015 | Bjordammen et al. | |
| 2015/0074732 A1 | 3/2015 | Green et al. | |
| 2015/0095932 A1* | 4/2015 | Ren | H04N 21/812 725/22 |
| 2015/0334434 A1 | 11/2015 | Green et al. | |
| 2016/0212455 A1 | 7/2016 | Manna | |
| 2017/0353751 A1 | 12/2017 | Green et al. | |

FOREIGN PATENT DOCUMENTS

| | | |
|---|---|---|
| WO | 2014/004955 A1 | 1/2014 |
| WO | 2014/107807 A1 | 7/2014 |
| WO | 2015/175121 A1 | 11/2015 |

OTHER PUBLICATIONS

"Determinism," Brittanica Concise Encyclopedia, Encyclopedia Brittanica, 2006, p. 537, 6 pages.
Amendment, filed Jan. 17, 2013, for U.S. Appl. No. 13/744,129, King et al., "Content Injection System and Methodology," 11 pages.
Amendment, filed Jul. 24, 2015, for U.S. Appl. No. 13/744,129, King et al., "Content Injection System and Methodology," 22 pages.
Amendment, filed Oct. 16, 2017, for U.S. Appl. No. 14/679,755, Green et al., "Systems and Methods to Identify Video Content Types," 14 pages.
Appellant's Brief, dated May 16, 2016, for U.S. Appl. No. 13/744,129, King et al., "Content Injection System and Methodology," 73 pages.
Appellant's Reply Brief, dated Nov. 4, 2016, for U.S. Appl. No. 13/744,129, King et al., "Content Injection System and Methodology," 10 pages.
Baum, "2: The Mind Is a Computer Program," What is Thought?, The MIT Press, 2004, pp. 33-65, 36 pages.
Decision on Appeal, dated Jan. 22, 2018, for U.S. Appl. No. 13/744,129, King et al., "Content Injection System and Methodology," 10 pages.
Examiner's Answer to Appeal Brief, dated Sep. 7, 2016, for U.S. Appl. No. 13/744,129, King et al., "Content Injection System and Methodology," 14 pages.
Extended European Search Report, dated May 3, 2018, for European Application No. 14907546.7-1208, 9 pages.
Final Office Action, dated Sep. 8, 2015, for U.S. Appl. No. 13/744,129, King et al., "Content Injection System and Methodology," 19 pages.
Finney et al., "Predicting Partial Paths from Planning Problem Parameters," Robotics, Science and Systems III, Burgard et al. (eds.), The MIT Press, 2008, pp. 41-48, 11 pages.
Green et al., "Systems and Methods to Deliver a Personalized Mediacast With an Uninterrupted Lead-in Portion," Office Action dated Sep. 30, 2016, for U.S. Appl. No. 14/485,416, 17 pages.
Green et al., "Systems and Methods to Deliver a Personalized Mediacast With an Uninterrupted Lead-in Portion," Preliminary Amendment filed Sep. 15, 2014, for U.S. Appl. No. 14/485,416, 13 pages.

(56) References Cited

OTHER PUBLICATIONS

Green et al., "Systems and Methods to Deliver a Personalized Mediacast With an Uninterrupted Lead-in Portion," Submission for RCE, filed Mar. 28, 2017, for U.S. Appl. No. 14/485,416, 15 pages.

Green et al., "Systems and Methods to Deliver a Personalized Mediacast With an Uninterrupted Lead-in Portion," U.S. Appl. No. 61/877,182, filed Sep. 12, 2013, 171 pages.

Green et al., "Systems and Methods to Deliver a Personalized Mediacast," Notice of Allowance dated Nov. 6, 2014, for U.S. Appl. No. 13/711,984, 22 pages.

Green et al., "Systems and Methods to Deliver a Personalized Mediacast," U.S. Appl. No. 61/611,403, filed Mar. 15, 2012, 75 pages.

Green et al., "Systems and Methods to Identify Video Content Types," Amendment, filed Apr. 26, 2017, for U.S. Appl. No. 14/679,755, 15 pages.

Green et al., "Systems and Methods to Identify Video Content Types," Amendment, filed Jun. 7, 2016, for U.S. Appl. No. 14/679,755, 16 pages.

Green et al., "Systems and Methods to Identify Video Content Types," Office Action, dated Aug. 22 2016, for U.S. Appl. No. 14/679,755, 22 pages.

Green et al., "Systems and Methods to Identify Video Content Types," Office Action, dated Mar. 10, 2016, for U.S. Appl. No. 14/679,755, 25 pages.

Green et al., "Systems and Methods to Identify Video Content Types," Preliminary Amendment filed Apr. 6, 2015, for U.S. Appl. No. 14/679,755, 10 pages.

Green et al., "Systems and Methods to Identify Video Content Types," U.S. Appl. No. 61/992,662, filed May 13, 2014, 100 pages.

Green et al., "Systems, Methods and Articles to Automatically Expose and Place Material in Streams of Programming," Amendment filed Jun. 25, 2015, for U.S. Appl. No. 13/679,828, 23 pages.

Green et al., "Systems, Methods and Articles to Automatically Expose and Place Material in Streams of Programming," Amendment filed Oct. 13, 2014, for U.S. Appl. No. 13/679,828, 20 pages.

Green et al., "Systems, Methods and Articles to Automatically Expose and Place Material in Streams of Programming," Office Action dated Jan. 28, 2015, for U.S. Appl. No. 13/679,828, 55 pages.

Green et al., "Systems, Methods and Articles to Automatically Expose and Place Material in Streams of Programming," Office Action dated May 14, 2014, for U.S. Appl. No. 13/679,828, 49 pages.

Green et al., "Systems, Methods and Articles to Automatically Expose and Place Material in Streams of Programming," Office Action dated Oct. 19, 2016, for U.S. Appl. No. 13/679,828, 18 pages.

Green et al., "Systems, Methods and Articles to Automatically Expose and Place Material in Streams of Programming," U.S. Appl. No. 61/561,186, filed Nov. 17, 2011, 70 pages.

Green et al., "Systems, Methods and Articles to Provide Content in Networked Environment," Amendment filed Sep. 11, 2014, for U.S. Appl. No. 13/956,020, 15 pages.

Green et al., "Systems, Methods and Articles to Provide Content in Networked Environment," Office Action dated Apr. 11, 2014, for U.S. Appl. No. 13/956,020, 13 pages.

Green et al., "Systems, Methods and Articles to Provide Content in Networked Environment," Office Action dated Oct. 7, 2014, for U.S. Appl. No. 13/956,020, 15 pages.

Green et al., "Systems, Methods and Articles to Provide Content in Networked Environment," U.S. Appl. No. 61/677,968, filed Jul. 31, 2012, 84 pages.

Green et al., "Systems, Methods and Articles to Provide Content in Networked Environment," U.S. Appl. No. 61/587,475, filed Jan. 17, 2012, 98 pages.

Hacker, "MP3: The Definite Guide," Sebastopol, CA, O'Reilly & Associates, Inc., First Edition, Mar. 2000, 378 pages.

International Preliminary Report on Patentability, dated Nov. 15, 2016, for International Application No. PCT/US2015/025279, 10 pages.

International Search Report and Written Opinion dated Jun. 29, 2015, for International Application No. PCT/US2015/025279, 13 pages.

International Search Report and Written Opinion, dated Aug. 10, 2015, for International Application No. PCT/US2014/068876, 9 pages.

International Search Report and Written Opinion, dated Sep. 8, 2016, for International Application No. PCT/US2016/036190, 8 pages.

King et al., "Content Injection System and Methodology," Amendment filed Jan. 7, 2011, for U.S. Appl. No. 11/985,143, 11 pages.

King et al., "Content Injection System and Methodology," Amendment filed Jul. 6, 2012, for U.S. Appl. No. 11/985,143, 25 pages.

King et al., "Content Injection System and Methodology," Amendment filed May 27, 2011, for U.S. Appl. No. 11/985,143, 21 pages.

King et al., "Content Injection System and Methodology," Notice of Allowance dated Oct. 15, 2012, for U.S. Appl. No. 11/985,143, 16 pages.

King et al., "Content Injection System and Methodology," Office Action dated Feb. 21, 2012, for U.S. Appl. No. 11/985,143, 14 pages.

King et al., "Content Injection System and Methodology," Office Action dated Feb. 25, 2015, for U.S. Appl. No. 13/744,129, 13 pages.

King et al., "Content Injection System and Methodology," Office Action dated Jul. 7, 2010, for U.S. Appl. No. 11/985,143, 12 pages.

King et al., "Content Injection System and Methodology," Office Action dated Mar. 29, 2011, for U.S. Appl. No. 11/985,143, 15 pages.

King et al., "Content Injection System and Methodology," Supplemental Response filed Jan. 20, 2011, for U.S. Appl. No. 11/985,143, 13 pages.

King et al., "Content Injection System and Methodology," U.S. Appl. No. 60/860,573, filed Nov. 21, 2006, 7 pages.

Krader, Noetics: The Science of Thinking and Knowing, Peter Lang Publishing, 2010, pp. 551-553, 5 pages.

Notice of Allowance, dated Apr. 19, 2017, for U.S. Appl. No. 14/485,416, Green et al., "Systems and Methods to Deliver a Personalized Mediacast With an Uninterrupted Lead-in Portion," 5 pages.

Notice of Allowance, dated Jan. 31, 2018, for U.S. Appl. No. 13/744,129, King et al., "Content Injection System and Methodology," 8 pages.

Office Action dated Feb. 8, 2017, for Green et al., "Systems and Methods to Identify Video Content Types," U.S. Appl. No. 14/679,755, 25 pages.

Office Action dated Jul. 17, 2017, for Green et al., "Systems and Methods to Identify Video Content Types," U.S. Appl. No. 14/679,755, 27 pages.

Office Action, dated Apr. 30, 2018, for U.S. Appl. No. 15/681,094, Green et al., "Systems and Methods to Deliver a Personalized Mediacast With an Uninterrupted Lead-in Portion," 20 pages.

Office Action, dated Dec. 28, 2017, for U.S. Appl. No. 14/679,755, Green et al., "Systems and Methods to Identify Video Content Types," 27 pages.

Pre-Appeal Brief Request for Review, dated Feb. 5, 2016, for U.S. Appl. No. 13/744,129, King et al., "Content Injection System and Methodology," 7 pages.

Pre-Brief Appeal Conference Decision, dated Apr. 19, 2016, for U.S. Appl. No. 13/744,129, King et al., "Content Injection System and Methodology," 4 pages.

Searle, Mind—A Brief Introduction, Oxford University Press, 2004, pp. 62-73, 16 pages.

Amendment, filed Oct. 1, 2018, for U.S. Appl. No. 15/681,094, Green et al., "Systems and Methods to Deliver a Personalized Mediacast With an Uninterrupted Lead-in Portion," 18 pages.

Final Office Action, dated Jul. 5, 2018, for U.S. Appl. No. 14/679,755, Green et al., "Systems and Methods to Identify Video Content Types," 30 pages.

(56) References Cited

OTHER PUBLICATIONS

Pre-Appeal Brief Request for Review, filed Oct. 5, 2018, for U.S. Appl. No. 14/679,755, Green et al., "Systems and Methods to Identify Video Content Types," 7 pages.

* cited by examiner

CONTENT MANAGEMENT AND PROVISIONING SYSTEM

BACKGROUND

Technical Field

The present disclosure generally relates to the automated provision of video content to video content consumers in a networked environment in a modified form from content broadcast or Webcast by content providers.

Description of the Related Art

Content providers such as television stations and networks (collectively, "broadcasters"), and Webcasters provide programming including programming content segments (e.g., music, talk, news, sports, weather, etc.) and non-programming content segments (e.g., advertisements, legal notices, etc.). Content providers' delivery of content via traditional "over the air" or terrestrial broadcast is often supplemented with Webcasts. In some instances, the Webcasts may be transmitted substantially contemporaneous with the broadcast. While content providers may employ repeaters and the like, broadcasts are typically limited in range to a geographic region.

Programming, for example broadcast or Webcast programming (collectively "mediacast programming"), often includes non-programming content (e.g., advertisements) interspersed with the subject matter of the programming content which is the principal or main subject of the programming offered by the content provider. Programming content segments are often interspersed with non-programming content segments that are sometimes referred to as "ad breaks" since the non-programming content segments are often composed principally of paid advertising or public service announcements. Content providers typically sell advertising time to generate revenue to fund operation, as well as to generate profits where the content provider is a commercial entity rather than a nonprofit entity. Given that most broadcasts are local in nature or extent, broadcasters often carry advertisements and other material which is of a somewhat local or parochial interest. For example, a local chain may place advertisements with a local broadcaster since the audience targeted by the local chain is also often local and local advertising tends to be less expensive than regional or national advertising.

Content providers are increasingly using content delivery networks (CDNs) to cache content throughout a network. CDNs are typically a system of computers, often configured as servers, and may be geographically dispersed with respect to one another. CDNs are typically operated by third party entities. CDNs may improve access, for example allowing lowest cost routing and reducing latency. CDNs may also provide a measure of redundancy.

It is not uncommon for content providers to purposely place some type of specialized marker or metadata within their produced content. Some of these markers are placed at locations that would occur approximately near the actual boundaries between content segments. This allows for content receivers and/or automated systems within the mediacast chain to be informed about whichever content properties it needs.

The metadata markers may be placed "in-band" or "out-of-band." In the context of media streams, in-band data means data sent in the same data stream as the audio and/or video content. Out-of-band data means any data not sent in the same data stream as the audio and/or video content. For example, a data format may allow a broadcaster to embed subtitles in-band along with the audio and/or video data so no other files are needed to view subtitles when the audio and/or video is played. An example of out-of-band data would be metadata files that can be loaded for a song played on a media player. This data is not contained in the same file as the audio data. This makes it easier to change subtitles or add new languages, i.e., the metadata file may be updated and distributed on its own independent of the audio data. A non-limiting example of a type of out-of-band metadata file is a SubRip Text (SRT) file.

Overall, these identifying markers are typically inserted by the content producer in a predetermined and automated way, such that redistributors or autonomous relayed networks may know if the upcoming content type allows a chance to invoke their own automated event handlers, or inform automated systems of when certain content segments are allowed to be replaced. In many instances, the metadata signals approximate boundaries between different types of content (e.g., programming content and advertising content), but such approximations may be offset or delayed from the true boundary between content segments by a significant amount of time (e.g., 0.2 seconds, 0.5 seconds, 1 second, 3 seconds).

BRIEF SUMMARY

A method of operation in a content management system, the content management system comprising at least one processor and at least one nontransitory processor-readable medium communicatively coupled to the at least one processor, may be summarized as including receiving, by the at least one processor, an encoded mediacast source data flow from one of a plurality of broadcasters or Webcasters over a data communications channel, the encoded mediacast source data flow comprises a plurality of encoded content segments each encoding at least audio data, the plurality of encoded content segments interspersed with a plurality of encoded metadata, at least some of the metadata including a metadata marker indicative of a presence of a boundary between two of the plurality of encoded content segments at a time proximate the metadata marker; decoding, by the at least one processor, the encoded mediacast source data flow to extract the audio data and the metadata; detecting, by the at least one processor, the presence of a metadata marker indicative of a boundary between two of the plurality of encoded content segments; selecting, by the at least one processor, an evaluation time window of the audio data proximate the detected metadata marker; detecting, by the at least one processor, a true boundary between two of the plurality of content segments within the evaluation time window of the audio data; logically associating, by the at least one processor, the detected metadata marker with the detected true boundary between the two of the plurality of content segments in the at least one nontransitory processor-readable medium; and generating, by the at least one processor, a modified mediacast flow by logically splitting the mediacast source data flow at the detected true boundary. Detecting the true boundary between two of the plurality of content segments within the evaluation time window of the audio data may include detecting amplitude variations of the audio data. Detecting amplitude variations of the audio data may include detecting amplitude variations utilizing an envelope follower. Receiving an encoded mediacast source data flow may include receiving, by the at least one processor, an encoded mediacast source data flow which may include a plurality of encoded content segments interspersed with a plurality of encoded metadata, the encoded metadata present in the same data flow stream as the encoded content segments. Receiving an encoded mediacast source data flow may include receiving, by the at least one processor, an encoded mediacast source data flow which may include a plurality of encoded content segments interspersed with a plurality of encoded metadata, the encoded metadata present in a separate data flow stream from the encoded content segments. Detecting the true boundary between two of the plurality of content segments within the evaluation time window of the audio data may include detecting a period of low amplitude for the audio data within the evaluation time window. Selecting an evaluation time window of audio data proximate the detected metadata marker may include selecting an evaluation time window of audio data that extends at least from at least one second before the detected metadata marker to at least on second after the detected metadata marker. Selecting an evaluation time window of audio data proximate the detected metadata marker may include selecting an evaluation time window having a duration of at least ten seconds. Selecting an evaluation time window of audio data proximate the detected metadata marker may include selecting an evaluation time window that extends from a time before the detected metadata marker to a time after the detected metadata marker. Receiving an encoded mediacast source data flow may include receiving an encoded mediacast source data flow from a remotely located processor-based system associated with at least one of a plurality of mediacasters. Receiving an encoded mediacast source dataflow may include receiving a mediacast source data flow encoded in one of an ICECAST, SHOUTCAST®, RealMedia®, Windows Media®, or QuickTime® format, and decoding the encoded mediacast source data flow may include decoding the encoded mediacast source data flow using an ICECAST, SHOUTCAST®, RealMedia®, Windows Media®, or QuickTime® encoder, respectively.

The method may further include causing delivery of the modified mediacast source data flow over a network by at least one component of the content management system.

The method may further include encoding the modified mediacast flow as content fragments; and providing the content fragments to a number of content delivery networks for retrieval of the content fragments by content consumers.

A content management system may be summarized as including at least one communications port communicatively coupleable to receive an encoded mediacast source data flow from a broadcaster or a Webcaster, the encoded mediacast source data flow comprising a plurality of encoded content segments each encoding at least audio data, the plurality of encoded content segments interspersed with a plurality of encoded metadata, at least some of the metadata including a metadata marker indicative of a presence of a boundary between two of the plurality of encoded content segments at a time proximate the metadata marker; at least one nontransitory processor-readable medium which stores a number of processor-executable instructions; and at least one processor communicatively coupled to the at least one communications port and communicatively coupled to the at least one nontransitory processor-readable medium to execute the processor-executable instructions, which execution causes the at least one processor to: receive, via the at least one communications port, an encoded mediacast source data flow from the broadcaster or the Webcaster, the encoded mediacast source data flow comprises a plurality of encoded content segments each encoding at least audio data, the plurality of encoded content segments interspersed with a plurality of encoded metadata, at least some of the metadata including a metadata marker indicative of a presence of a boundary between two of the plurality of encoded content segments at a time proximate the metadata marker; decode the encoded mediacast source data flow to extract the audio data and the metadata; detect the presence of a metadata marker indicative of a boundary between two of the plurality of encoded content segments; select an evaluation time window of the audio data proximate the detected metadata marker; detect a true boundary between two of the plurality of content segments within the evaluation time window of the audio data; logically associate the detected metadata marker with the detected true boundary between the two of the plurality of content segments in the at least one nontransitory processor-readable medium; and logically split the mediacast source data flow at the detected true boundary to generate a modified mediacast flow. The at least one processor may detect amplitude variations of the audio data. The at least one processor may detect amplitude variations utilizing an envelope follower. The at least one processor may receive an encoded mediacast source data flow which may include a plurality of encoded content segments interspersed with a plurality of encoded metadata, the encoded metadata present in the same data flow stream as the encoded content segments. The at least one processor may receive an encoded mediacast source data flow which may include a plurality of encoded content segments interspersed with a plurality of encoded metadata, the encoded metadata present in a separate data flow stream from the encoded content segments. The at least one processor may detect a period of low amplitude for the audio data within the evaluation time window. The at least one processor may select an evaluation time window of audio data that extends at least from at least one second before the detected metadata marker to at least on second after the detected metadata marker. The at least one processor may select an evaluation time window having a duration of at least ten seconds. The at least one processor may select an evaluation time window that extends from a time before the detected metadata marker to a time after the detected metadata marker. The at least one processor may receive an encoded mediacast source data flow from a remotely located processor-based system associated with at least one of a plurality of mediacasters. The at least one processor may receive a mediacast source data flow encoded in one of an ICECAST, SHOUTCAST®, RealMedia®, Windows Media®, or QuickTime® format, and decoding the encoded mediacast source data flow may include decoding the encoded mediacast source data flow using an ICECAST, SHOUTCAST®, RealMedia®, Windows Media®, or QuickTime® encoder, respectively. The at least one processor may cause delivery of the modified mediacast source data flow over a network via the at least one communications port of the content management system.

The at least one processor may encode the modified mediacast flow as content fragments; and provide the content fragments to a number of content delivery networks for retrieval of the content fragments by content consumers.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
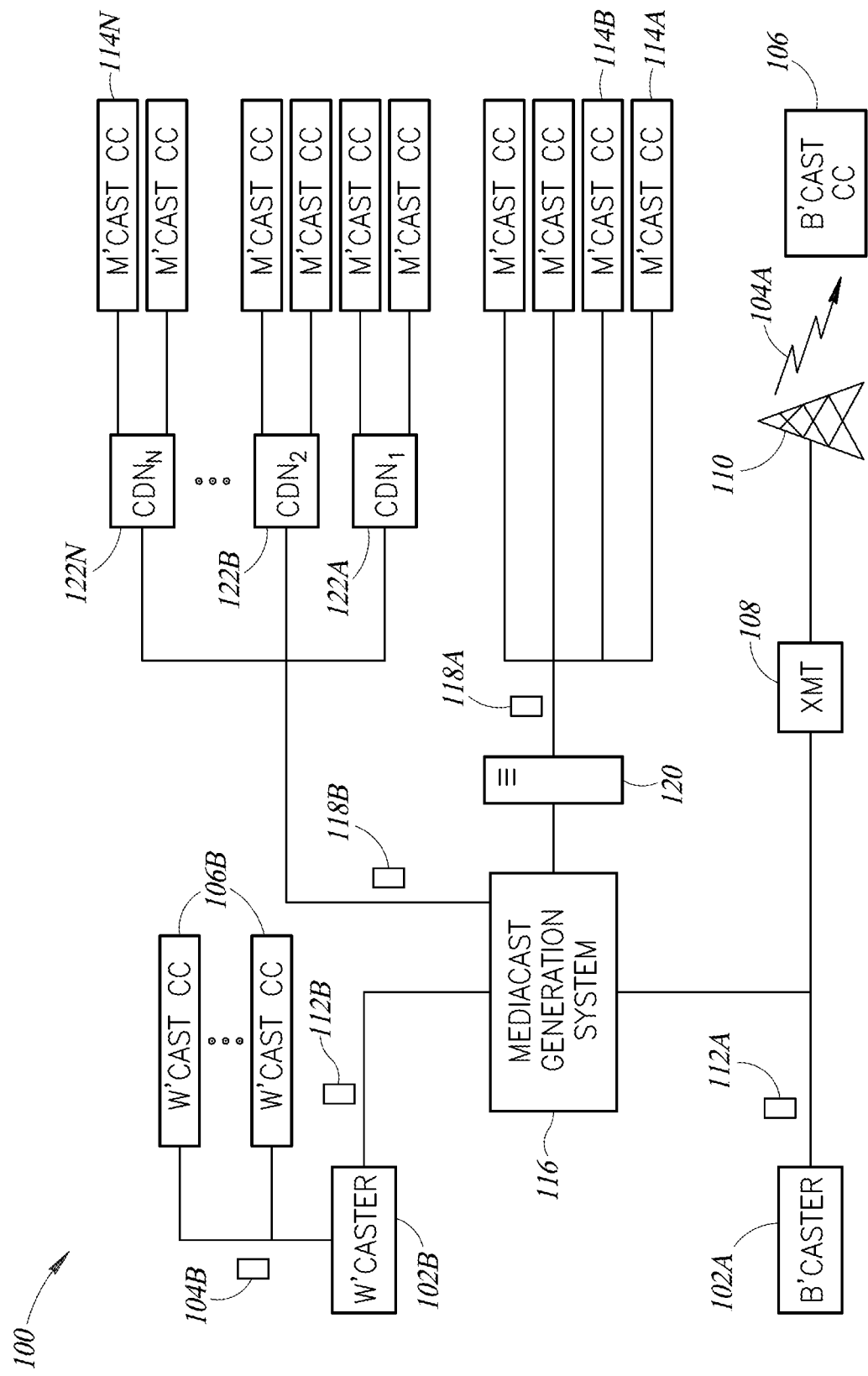
FIG. 1 is a schematic diagram of a networked environment, including a broadcaster and a Webcaster, a number of broadcast or Webcast content consumers, a mediacast generation system operable to generate a plurality of mediacasts, and an optional content delivery network (CDN) to deliver the mediacasts to respective mediacast content consumers, according to one illustrated implementation.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations. In other instances, well-known mathematical and statistical methods for performing statistical analyses and other well-known mathematical operation have not been described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the implementations.

One or more implementations disclosed herein are directed to systems, methods, and components operative for a reliable implementation of intelligent content and program type detection, including identification of true boundaries between content segments. In some implementations, a broadcast provider sends a broadcast as a stream, encoded in a format such as ICECAST, for example. Typically, during a switch between content types, such as a switch between standard programming and advertisement content, an automation system of the broadcaster also sends a piece of identifying metadata. In implementations disclosed herein, a centralized mediacast generation system may receive the encoded stream of content and metadata from one or more broadcasters, process the metadata, time correct the metadata, and then slice the content on the exact boundary where the content changes occur.

In some implementations, the broadcast provider encodes the program content, including the metadata, and sends the stream output to the mediacast generation system. The mediacast generation system may decode the audio stream data directly into Waveform Audio File Format (WAVE) data while using an envelope follower to measure program amplitude, for example. When the mediacast generation system detects a metadata marker, an analyzer process may look inside of a buffered time window up to X (e.g., 0.8, 1, 2, 5, 10) seconds. The WAVE data may be analyzed to look for a period most likely to be the true boundary or split point between content segments. The content may then be split up on the new true boundary which has been detected and the content may be forwarded along to a subsequent stage of the streaming system. If no marker is detected, the original metadata split point may be utilized.

As used herein, the terms broadcast or Webcast programming refers to a sequence of content intend to be broadcast or Webcast by a broadcaster or Webcaster. The broadcast or Webcast programming may include programming content and non-programming content. As used herein, programming content refers to content which is the primary or main subject of the broadcast or Webcast. Examples of programming content include news segments for a video news station. As used herein, non-programming content refers to content which is not the primary or main subject of the broadcast or Webcast. Examples of non-programming content include advertisements or commercials. The programming content and/or the non-programming content may be either non-replaceable or replaceable, as identified by an entity, for example a broadcaster or Webcaster. Non-replaceable content is content that is not to be replaced; examples include news segments or sports segments. Replaceable content is content that may be replaced; examples include a block of advertisements video news station or programming segment of a sports video station.

As used herein, the term new or replacement programming and non-programming content segments refers to content used to generate a modified mediacast, in addition to the broadcast or Webcast programming. Such may include programming content and non-programming content. Such may be substituted for replaceable programming or replaceable non-programming content in generating a mediacast or otherwise incorporated therein. Alternatively, new or replacement programming and non-programming content segments such may be used in addition to replaceable programming or replaceable non-programming content in generating mediacasts. As used herein, manifest content refers to a set of entries that specify locations or specific properties of content or media fragments, specifying a linear or sequential order. A used herein, manifest consumer device refers to a mediacast content consumer device (e.g., media player executing on a processor-based device) that requests and utilizes manifest content. As used herein, dynamic manifest refers to a manifest file that is generated upon a request of a mediacast content consumer device. As used herein, a content or media fragment refers to a digital media "file" into which content has been broken, typically having a duration of 2-10 seconds. For example, content or media may be based on mp4 (FMP4), MPEG TS (M2TS), MPEG 2, MPEG 4, HTTP Live Streaming (HLS), etc.

System Overview

FIG. 1 shows an environment 100 including a radio broadcaster 102A delivering a broadcast 104A to a plurality of broadcast content consumers (illustrated collectively) 106 via a broadcast transmitter 108 and antenna 110. The environment 100 may additionally, or alternatively, include a Webcaster 102B that provides Webcasts 104B to a plurality of Webcast consumers 106B via servers and various networks (e.g., Internet). Generally, the environment 100 may include one or more terrestrial broadcasters, cable broadcasters, satellite broadcasters, Webcasters, multi-casters, etc.

The broadcast 104A or Webcast 104B (collectively 104) consists of broadcaster or Webcaster programming (collectively "mediacaster programming"), which includes a variety of programming content and a variety of non-programming content, which may be divided up into segments. Programming content segments are typically portions of the programming that are the principal or main subjects of the broadcast or Webcast, and may be used to identify or characterize the broadcaster or Webcaster. Examples of programming content include songs, news, weather, traffic, talk shows, comedy sketches, video content, or the like. Non-programming content segments are the remaining portions of the programming which are not the principal or main subjects of the broadcast or Webcast. Examples of non-programming content include paid advertisements or commercials, legally required announcements (e.g., station identification announcements), and public service announcements.

Many broadcasters or Webcasters 102 also would like to provide all or a portion of their programming to mediacast content consumers 114A, 114B-114N (ten illustrated, three called out, collectively 114) via alternative channels such as Webcasts, podcasts, streaming and similar delivery methods. Such alternative channels typically provide for on-demand delivery, for example as a unicast streaming, or in some instances as a multicast streaming to the media content consumers 114. The alternative channels typically permit geographically diverse mediacast content consumers 114 to access the programming content using communications technologies other than local over the air (i.e., "OTA" and/or terrestrial) broadcast transmission or transmission via local media distributors such as television networks.

To accommodate the diverse tastes and interests of the respective mediacast content consumers 114, the programming 112 may be further apportioned into replaceable programming content segments and non-replaceable programming content segments. Replaceable programming content segments include any portion of the programming identified by the broadcaster, Webcaster or other entity as being eligible for being replaced by replacement content. Non-replaceable programming content may include any portion of the programming identified by the broadcaster or Webcaster or other entity as not eligible for replacement. Typical examples of non-replaceable programming content include television talk show segments, news, sports, weather, and financial segments within the programming supplied by the broadcaster or Web caster.

Optionally, the non-programming content segments (e.g., commercials, advertisements) of the broadcast or Webcast provided by the broadcaster or Webcaster may be apportioned into replaceable non-programming content segments and non-replaceable non-programming content segments. Replaceable non-programming content segments can include advertisements or open-air "spots" carried by the programming supplied by the broadcaster or Webcaster that may have limited or no value to the mediacast content consumers 114. Examples include advertisements for products and services available in the broadcaster or Webcaster's home market, but unavailable in markets where many or even all of the mediacast content consumers 114 may be located. Non-replaceable non-programming content segments can include legally required station identification announcements, public service announcements, emergency broadcasting network tests, and the like. Non-replaceable non-programming content segments can additionally or alternatively include advertisements or commercials with generic appeal or related to a wider market, for instance a national market. Non-replaceable non-programming content segments can additionally or alternatively include advertisements or commercials for which Web distribution has been guaranteed, for instance guaranteed by the broadcaster or Webcaster.

As depicted in FIG. 1, a mediacast generation system 116 may be coupled to receive programming 112A, 112B (collectively 112) that constitutes the broadcast or Webcast. The mediacast generation system 116 may be configured to generate, produce or otherwise provide mediacasts 118A, 118B (two shown, collectively 118) for respective ones of the mediacast content consumers 114.

While illustrated as a single mediacast generation system 116 communicatively coupled to both the broadcaster 102A and Webcaster 102B, many implementations will employ two or more separate mediacast generation systems 116, for example a respective mediacast generation system 116 for each of the broadcaster(s) and/or Webcaster(s). All or a portion of the mediacast generation system 116 may be separately or co-located. All or a portion of the mediacast generation system 116 may be co-located at the broadcaster or Webcaster facilities. All or a portion of the mediacast generation system 116 may be located separately from the broadcaster or Webcaster facilities. All or a portion of the mediacast generation system 116 may be implemented "in the cloud" as a virtualized system or component. All or a portion of the mediacast generation system 116 may be co-located at the mediacast content consumer 114.

In some implementations, the mediacasts 118 include non-programming content, for instance advertisements or commercials. The non-programming content may include non-programming content from the broadcast or Webcast 104. The non-programming content may include new or replacement non-programming content, which did not appear in the broadcast or Webcast 104. Such new or replacement non-programming content may substitute for or replace in the mediacast 118, in whole or in part, non-programming content from the broadcast or Webcast 104.

As discussed in further detail below, the mediacast generation system 116 may be operative to detect a true or exact boundary between content segments in the broadcast or Webcast programming by analyzing the content itself as well as metadata or markers intended to signal approximate beginnings or endings of content segments.

Figure 6:
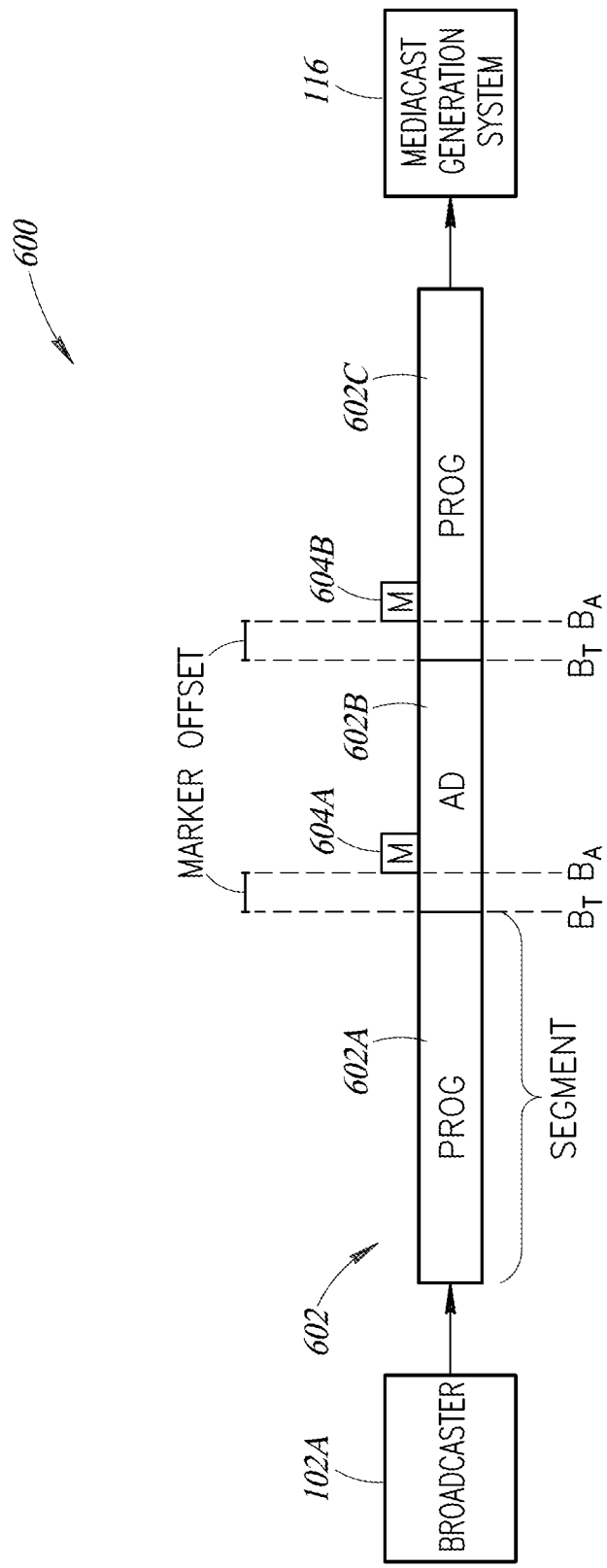
FIG. 6 is a timing diagram illustrating the timing for an encoded stream of content and metadata output by an encoder associated with a broadcaster, according to one illustrated implementation FIG. 7 a flow diagram illustrating the operation of a monitor of a mediacast generation system to determine a true boundary between two content segments, according to one illustrated implementation.

FIG. 6 is an example timing diagram 600 which shows an encoded stream 602 of audio data output from the radio broadcaster 102A and delivered to the mediacast generation system 116 over a suitable data communications channel. The encoded stream 602 includes a first programming segment 602A, an advertising segment 602B, and a second programming segment 602C. In addition to the audio data, the radio broadcaster 102A also provides metadata markers 604A and 604B (collectively "metadata markers 604") which signal the approximate boundary between content segments 602A and 602B and between content segments 602B and 602C, respectively. As shown, the metatdata marker 604A signifies an approximate boundary $B_A$ between content segments 602A and 602B that is offset (i.e., delayed) from a true boundary $B_T$ between the content segments 602A and 602B by an offset period referred to herein as a MARKER OFFSET. In some instances, the approximate boundary provided by the marker may occur prior to the true boundary. Generally, the offset period is the period of mistiming between the approximate boundary provided by the marker and the true boundary. Similarly, the metadata marker 604B signifies an approximate boundary $B_A$ between content segments 602B and 602C that is delayed from a true boundary $B_T$ between the content segments 602B and 602C by the MARKER OFFSET period. Such offset between the approximate boundary $B_A$ and the true boundary $B_T$ can be a significant amount of time (e.g., 0.2 seconds, 0.5 seconds, 1 second, 3 seconds).

Referring back to FIG. 1, the detection of the true boundary between content segments facilitates the automated generation of a mediacast with new or replacement programming content segments and/or new or replacement non-programming content segments combined with the non-replaceable programming content segments supplied by the broadcaster or Webcaster. As explained in more detail herein, the detection of beginnings and endings of content segments, or boundaries between content segments, may also be part of a trigger condition for the buffering of content, for instance non-replaceable content segments, and/or the subsequent unbuffering, delivery or playing of the buffered content.

As illustrated in FIG. 1, the mediacast generation system 116 may transmit or deliver the mediacasts 118 to respective mediacasts content consumers 114 via one or more networks (e.g., Internet, local area networks, wide area networks, wired networks, wireless networks). The mediacast generation system 116 may include, or may employ, one or more server computer systems to transmit or deliver the mediacasts 118.

Additionally or alternatively, the mediacast generation system 116 may optionally employ one or more content delivery networks (CDNs) 122A-122N (three illustrated, collectively 122) to cache, store, or distribute all or a portion of the mediacasts 118. Although the broadcaster or Webcaster 102 may have access to sufficient infrastructure to support the delivery of hundreds or thousands of mediacasts 118 directly to each of the mediacast content consumers 114, in many instances the broadcaster or Webcaster 102 may alternatively route the mediacasts 118 for at least a portion of the mediacast content consumers 114 through a CDN 122. A CDN 122 supplies the necessary infrastructure in the form of various network servers, switches, routers and the like useful in delivering the mediacasts 118 to each of the content consumers 114. CDNs 122 can be regionally located in closer proximity to the mediacast content consumers 114 and can be linked to the broadcaster or Webcaster via one or more high speed or high bandwidth connections to minimize the latency and improve the overall mediacast experience of each of the mediacast content consumers 114. In some instances, the CDNs 122 provide network redundancy to improve the reliability of the connection between the mediacast content consumers 114 and the broadcaster or Webcaster 122.

Additionally or alternatively, the mediacast generation system 116 may transmit or deliver the mediacasts 118 via terrestrial broadcasts, satellite broadcasts, cable broadcasts, multicasts, unicasts, or by any other suitable communication system.

Mediacast Generation System

Figure 2:
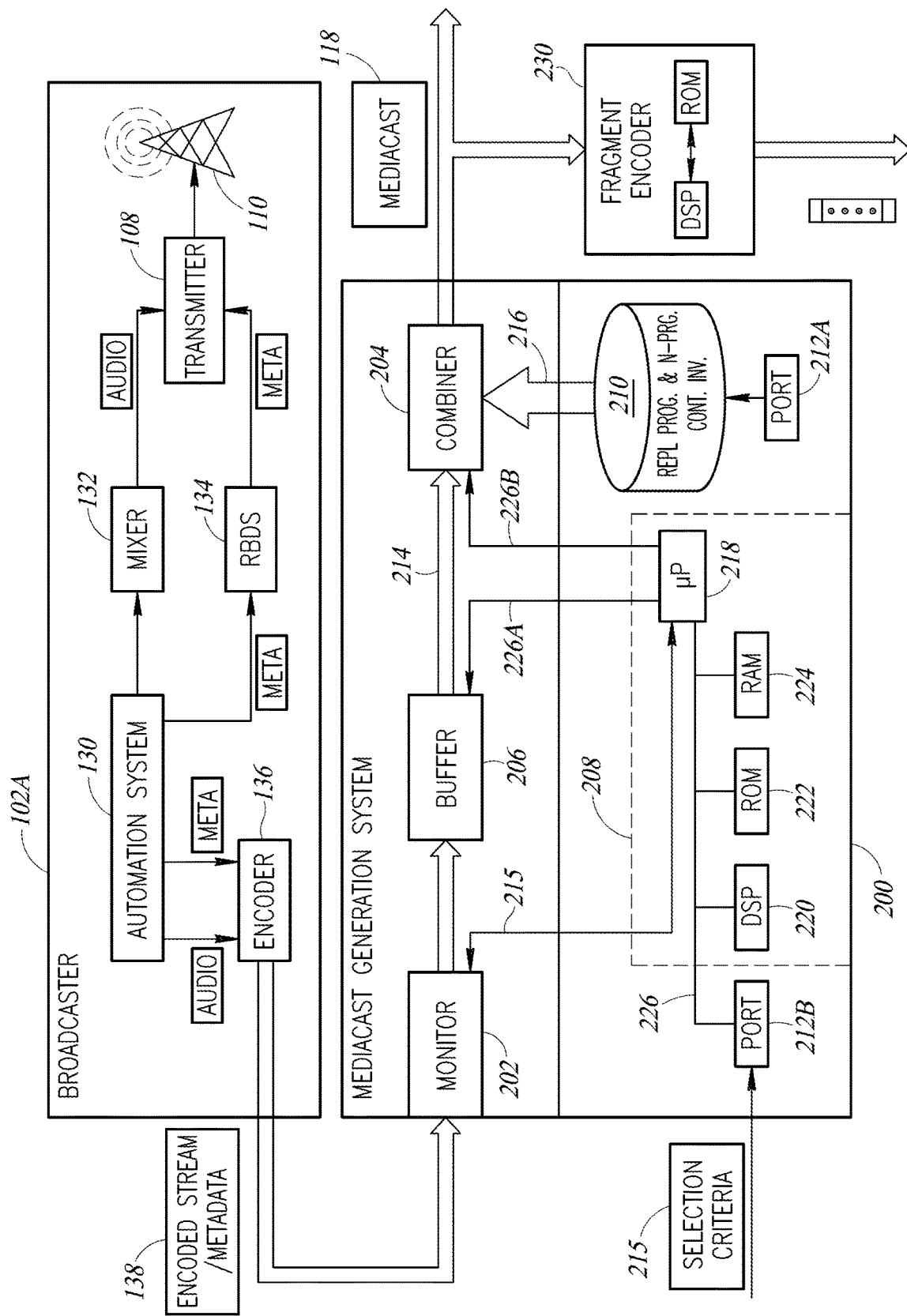
FIG. 2 is a schematic diagram of a mediacast generation system including a monitor and combiner coupled to detect true boundaries between content segments in broadcasts or Webcasts, optionally insert replacement programming and non-programming content segments for the replaceable content to generate a mediacast and an optional fragment encoder coupled to encode the mediacast as content or media fragments, according to one illustrated implementation.

FIG. 2 shows an example of a mediacast generation system 200 and the broadcaster 102A, according to one illustrated implementation. The mediacast generation system 200 may be similar or identical to the mediacast generation system 116 of FIG. 1. The mediacast generation system 200 may be configured physically as a single system, or may comprise multiple independent systems.

The broadcaster 102A employs one or more automation systems 130 to modify or control programming. For example, the one or more automation systems 130 may control play selections by utilizing on-air schedules including music, spoken word, and commercials that have been generated by content scheduling software and subsequently exported by a file system to the automation system.

The broadcaster 102A may typically include a source of programming, for example, one or more sound boards for a radio broadcaster or video boards for a television broadcaster. These sources of programming are referred to collectively herein as a mixer 132. The broadcaster 102A will typically include one or more transmitters 108 and associated antenna(s) 110 to wirelessly transmit programming. Various types of transmitters 108 and antennas 110 may be suitable. For example, commercially available transmitters and antennas for amplitude modulated (AM) or frequency modulated (FM) radio, or for analog (e.g., NTSC standard) or digital (e.g., ATSC standard) television broadcasts, or other forms of wireless broadcast communications. Typically, additional circuitry (not shown) is present to filter and otherwise condition or process the signals. Broadcasters 102A often employ transponders or repeaters (neither shown) to extend the range or coverage of their service area. In any case, a geographic range of the broadcast 104A of the programming is typically limited.

In addition to transmitting audio data, the broadcaster 102A may also transmit metadata via use of a radio broadcast data system (RBDS) 134. The RBDS 134 may be a communications protocol standard for embedding small amounts of metadata in conventional broadcasts. In particular, the RBDS 134 standardizes several types of information transmitted, including time, station identification, and program information.

The automation system 130 may send audio data and metadata to one or more encoders 136, which produces a real-time encoded stream 138 of content and metadata that is delivered to the mediacast generation system 200. The encoder(s) 136 may take the form of fragment encoder system(s) that encodes content, including original content from the broadcast into fragments suitable for storage, retrieval and playing on media players. The encoder(s) 136 encodes whatever material is provided to the encoder(s).

The mediacast generation system 200 includes a monitor 202 to detect content transitions in the programming and a combiner 204 operable to selective combine portions of the broadcast or Webcast programming 112 (FIG. 1) with new or replacement content. The mediacast generation system 200 may also include a buffer 206, a control subsystem 208, and a nontransitory computer- or processor-readable medium 210, each directly or indirectly communicatively coupled with the monitor 202 and combiner 204. As explained in more detail below, the buffer 206 is communicatively coupled, configured and/or controlled to temporarily buffer or store broadcast or Webcast programming content and selectively release, deliver or unbuffer the programming content on occurrence of certain conditions. The control subsystem 208 is communicatively coupled and configured to control the operation of the mediacast generation system 200, including the various components thereof. The nontransitory computer- or processor-readable medium 210 stores new or replacement programming content segments and/or new or replacement non-programming content segments for use in combining with portions of the broadcast or Webcast programming 112 (FIG. 1) to create the mediacasts 118 (FIG. 1) to be delivered to mediacast content consumers via one or more communications systems (e.g., Webcast, broadcast, etc.).

The mediacast generation system 200 is communicatively coupled to receive original encoded broadcast or Webcast stream 138 from a broadcaster or Webcaster 102 (or other content provider). For example, the mediacast generation system 200 may be communicatively coupled to receive the encoded stream 138 of content and metadata from the encoder of the broadcaster 102A.

An optional communications port 212A permits the receipt of new or replacement programming content segments and/or new or replacement non-programming content segments from an external source, for example from an external advertiser, external advertising marketplace, external replacement programming content provider and the like. An optional communications port 212B allows receipt of commands, instructions, data, and programming. For example, in some implementations various types of selection criterion 215 may be received via communications port 212B. While two ports 212A, 212B (collectively 212) are illustrated, the mediacast generation system 200 may include fewer or greater number of ports 212.

As noted above, a function of the mediacast generation system 200 is to detect content type or content transitions that signify the beginning and/or ending of the different content segments. The beginning and ending of at least certain content segments are conditions that may wholly or partially control an operational state of the combiner 204, and optionally of the buffer 206. The occurrence of such may for example, satisfy one condition for triggering the replacement of replaceable programming content segments with replacement programming to generate or create the mediacasts 118. The occurrence of such may for example, satisfy one condition for triggering the replacement of replaceable non-programming content segments with new or replacement non-programming content segments to generate or create the mediacasts 118. In either situation, a second condition may need to be satisfied, that is that a current content segment be completed before switching between the broadcast or Webcast and some repository of new or replacement content. Likewise, the mediacasts 118 may include new or replacement non-programming content segments, for example, selected based upon one or more mediacast content consumer demographics, locations, etc., to create a mediacast 118 uniquely tailored to an individual mediacast content consumer 114.

In some implementations, the monitor 202 detects content type or content transitions in programming content. The monitor 202 may, for example, detect the start or end of replaceable programming or replaceable non-programming content segments in the originating broadcast or Webcast programming 112. The monitor 202 may, for example, detect the start or end of replaceable programming content segments, for instance, entertainment content (e.g., songs) in the originating broadcast or Webcast programming 112.

The buffer 206 is downstream from the monitor 202 and may buffer original broadcast or Webcast programming 112 when necessary or desirable. For example, such may allow time-shifting of content segments contained in the originating broadcast or Webcast programming 112, which may increase flexibility of the mediacast generation system 200. For example, where a duration of new or replacement programming or non-programming content segments either individually or cumulatively match a duration of the replaceable programming or non-programming content segments that they are to replace, the duration of the original broadcast or Webcast programming 112 stored by the buffer 206 may remain constant or not change. Where the duration of new or replacement programming or non-programming content segments either individually or cumulatively exceed a duration of the replaceable programming or non-programming content segments that they are to replace, the original broadcast or Webcast programming 112 stored by the buffer 206 may grow or increase. Where a duration of new or replacement programming or non-programming content segments is less than a duration of the corresponding replaceable programming or non-programming content segments either individually or cumulatively that they are to replace, the broadcast or Webcast programming stored by the buffer 206 may shrink or be reduced. Notably, while the contents of the buffer may be played out during non-replaceable content segments of the broadcast, the buffer content is reduced by playing content from the buffer during replaceable content segments since there is no simultaneous storing to the buffer during these periods. The buffer may function as a queue, receiving new content segments at one end of the queue, while playing previously received content segments from the other end of the queue. The buffer 206 may advantageously allow selection of new or replacement programming and non-programming content segments having durations without particular regard to trying to match a duration of the replaceable programming and non-programming content segments that they are to replace.

The duration of any asynchronicity between the originating broadcast or Webcast programming 112 and the mediacast 118 may be permitted to "float"—in other words, the selection of replacement programming and non-programming segments may be performed without specific regard to the duration of the new or replacement programming or non-programming segments or the duration of the replaceable programming or non-programming segments being replaced. In at least some implementations, new or replacement programming and non-programming content segments are not selected until content type or content transitions are detected in the originating broadcast or Web cast programming 112 by the monitor 202. Upon detection by the monitor 202 a start of a non-replaceable content segment in the broadcast or Webcast programming 112, buffering of the non-replaceable originating broadcast or Webcast programming 112 to the buffer 206 can be started. Upon detection by the monitor 202 of an end of a non-replaceable content segment (e.g., programming content, non-programming content) in the broadcast or Web cast programming 112, delivery of a current new or replacement content segment to the combiner 204 may be allowed to finish, then the buffered content may be delivered from the buffer 206 to the combiner 204.

The combiner 204, also sometimes referred to as an alternative content inserter, is coupled downstream of the buffer 206 in this illustrated implementation. The combiner 204 selectively combines portions of the broadcast or Webcast programming 112 (e.g., non-replaceable content segment) with new or replacement programming and non-programming content segments to generate, create or otherwise produce the mediacasts 118. For example, the combiner 204 may combine material from the new or replacement programming and non-programming content segment inventory 210 with non-replaceable programming and non-programming content segments of the originating broadcast or Webcast programming 112. For instance, replaceable programming content segments (e.g., news video segments) appearing in the originating broadcast or Webcast programming 112 may be replaced with replacement programming content segments (e.g., news video segments selected based at least in part on mediacast content consumer specifications). In some instances, the new or replacement programming and non-programming content segments may be targeted for a particular mediacast consumer or group of consumers. In some instances, the new or replacement non-programming content may be more appropriate for wider audience than the replaceable non-programming content in the broadcast or Webcast which is being replaced.

The combiner 204 can take a variety of forms, as simple as a switch that selectively couples a downstream component or output of the mediacast generation system 200 alternatively between a first input 214 (e.g., from buffer 206) that carries the originating broadcast or Webcast programming 112 and a second input 216 such as the insertion material inventory 210 that carries the replacement programming and non-programming content segments.

The control subsystem 208 may take a variety of forms. Typically, the control subsystem 208 will include one or more controllers, for example, microprocessors 218, DSPs 220, ASICs, PGAs, microcontrollers or the like. The control subsystem 208 will also typically include one or more nontransitory nonvolatile memories such as ROM or FLASH memory 222 and/or one or more volatile memories such as RAM 224. One or more communications ports 212, for example, parallel communications ports (e.g., Ethernet port) or serial communications ports (e.g., Universal Serial Bus ports) may be considered part of the control subsystem 208 or may be considered separate therefrom. The one or more communications ports 212 may allow wired and/or wireless communications with an alternative source of replacement programming and non-programming content segments. The one or more communications ports 212 may allow wired and/or wireless communications to receive instructions, commands, data or programming (e.g., firmware upgrades).

The various components of the control subsystem 208 may be coupled via one or more buses 226 (only one shown), for example, one or more power buses, communications buses, instruction buses, address buses, data buses, etc.

The control subsystem 208 is configured or programmed to control the operation of the mediacast generation system 200. The control subsystem 208 is communicatively coupled to receive via signal line 215 one or more signals or data packets upon detection of the start, end, duration, or any combination thereof of a replaceable programming content segment, replaceable non-programming content segment, or non-replaceable programming content segment in the broadcast or Webcast programming 112. The one or more signals or data packets may also be indicative of other information, for instance, the type of content segment, content of the content segment, format of the content segment, or language of the content segment.

The control subsystem 208 may, for example, determine to insert a new or replacement programming content segment upon detecting a start of a replaceable programming content segment in the broadcast or Webcast programming 112. The control subsystem 208 provides control signals to the buffer 206 via a buffer control line 226A to control the buffering or caching of originating broadcast or Webcast programming 112 by the buffer 206. The control subsystem 208 provides control signals to the combiner 204 via combiner control line 226B to control the combining of new or replacement programming and/or non-programming content segments with non-replaceable programming and/or non-programming content segments of the broadcast or Webcast programming 112. The control signals may cause the buffer 206 to selectively store or buffer originating broadcast or Webcast programming 112 while the combiner 204 is combining or inserting or placing replacement programming or non-programming content segments to generate or create the mediacast 118.

In one or more implementations, one or more optional fragment encoders 230 may be positioned downstream of the mediacast generation system 200, or may be integrated therewith. Such may be particularly useful where the mediacasts will be delivered via "chunk based" delivery, for example via one or more CDNs 122 (FIG. 1).

The mediacast generation system 200 may be similar, or even identical, in structure and/or operation to the content injection system described in U.S. patent application publication No. 2008/0120638 published May 22, 2008 or U.S. patent application Ser. No. 61/561,186 filed Nov. 17, 2011. That content injection system advantageously employs selective buffering or caching so that replacement programming or non-programming content segments do not need to be exactly the same length or duration as the replaceable programming or non-programming content segments they supplant. Additionally, or alternatively, the mediacast generation system 200 may in some respects be similar or identical in structure and/or operation to that described in U.S. patent application publication No. 2007/0074243. Additionally, or alternatively, the mediacast generation system 200 may in some respects be similar or identical in structure and/or operation to that described in U.S. Pat. No. 6,577,716.

Figure 3:
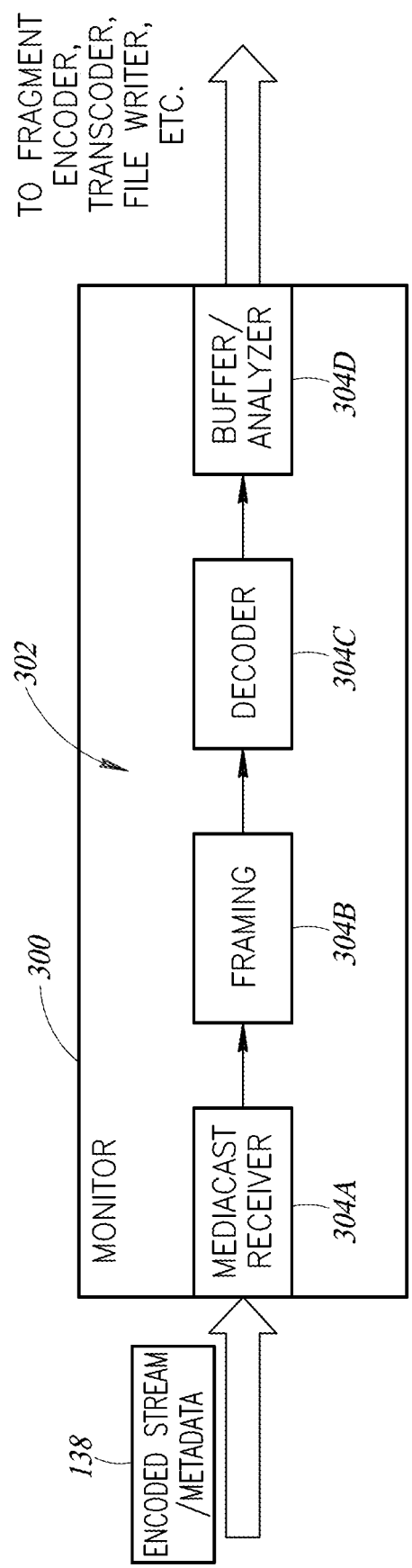
FIG. 3 is a schematic diagram of a monitor of a mediacast generation system, according to one illustrated implementation.

FIG. 3 shows an example of a monitor 300 that may be implemented as a component of the mediacast generation system 200 of FIG. 2, according to one illustrated implementation. For example, the monitor 300 may be similar or identical to the monitor 202 of FIG. 2. In general, one purpose of the monitor 300 is to receive a mediacast source data flow 138 from a content provider and analyze it in real-time (or non-real-time) for boundaries between different content segments, such as boundaries between non-replaceable content (e.g., programming content) and replaceable content (e.g., advertisements).

To allow flexibility in analyzing content streams, the monitor 300 utilizes a modular design defined by a grouping of system chains 302. Each system chain 302 analyzes a single mediacast source data flow. Within each system chain 302, a collection of data channels 304 is strung together. FIG. 3 illustrates a single system chain 302 comprising four data channels—a mediacast receiver 304A, a framing module 304B, a decoder 304C, and a buffer/analyzer 304D. The data channels 304 are assembled in such a way so that they are operative to acquire the mediacast source data flow at the mediacast receiver 304A, decode the attributes and content data (e.g., image content data, audio content data, metadata) at the framing module 304B and the decoder 304D, and analyze and/or buffer the content data at the buffer/analyzer 304D. The analyzed content data may be output to a fragment encoder (e.g., the fragment encoder 230 of FIG. 2), output to a transcoder (e.g., a 32 kbps transcoder), output to a file writer, etc. In some implementations, the output of the buffer/analyzer 304D may be forwarded to multiple components, for example, to form one or more transcoding or archiving systems. Advantageously, this modular set up allows for a single mediacast source data flow to be sent to multiple unique outputs without requiring any changes by the content provider or content producer. Each new output may be added or removed in real-time without stopping the main input dataflow.

In some implementations, the framing module 304B may divide video content data from audio content data of a mediacast source data flow. In these implementations, the decoder 304c may comprise separate audio and video decoders, and the buffer/analyzer 304D may comprise separate audio and video buffers and/or separate audio and video analyzers. In some implementations, the analyzed video content data and analyzed audio content data may both be sent to one or more outputs, while only one of the video content data and audio content data is sent to different one or more outputs. For example, analyzed video content data and analyzed audio content data may be sent for playback on a streaming client configured for video and audio playback, while only the analyzed audio content may be sent to a streaming client configured only for audio playback.

Figure 4:
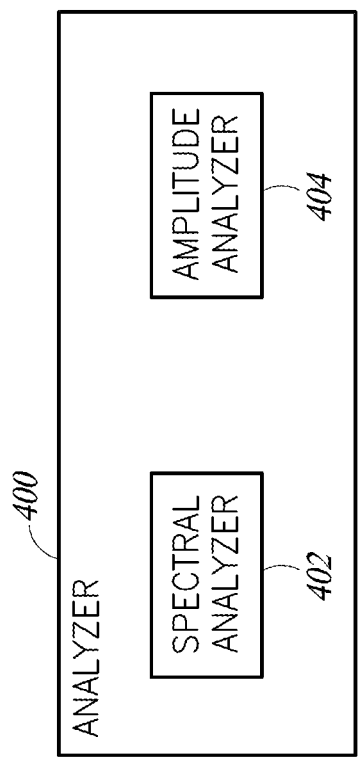
FIG. 4 is a schematic diagram of an analyzer of a mediacast generation system that includes a number of analyzers for various element types, according to one illustrated implementation.

FIG. 4 illustrates an analyzer module 400 that includes two types of analyzers. In particular, the analyzer module 400 includes a spectral analyzer 402 to analyze spectral representations of audio data, and an amplitude analyzer 404 to analyze amplitude representations of audio data. In some implementations, the analyzer module 400 may include additional or fewer types of analyzers. The utilization of such analyzers 402 and 404 is discussed in further detail below.

Specific Examples of Operation

Figure 5:
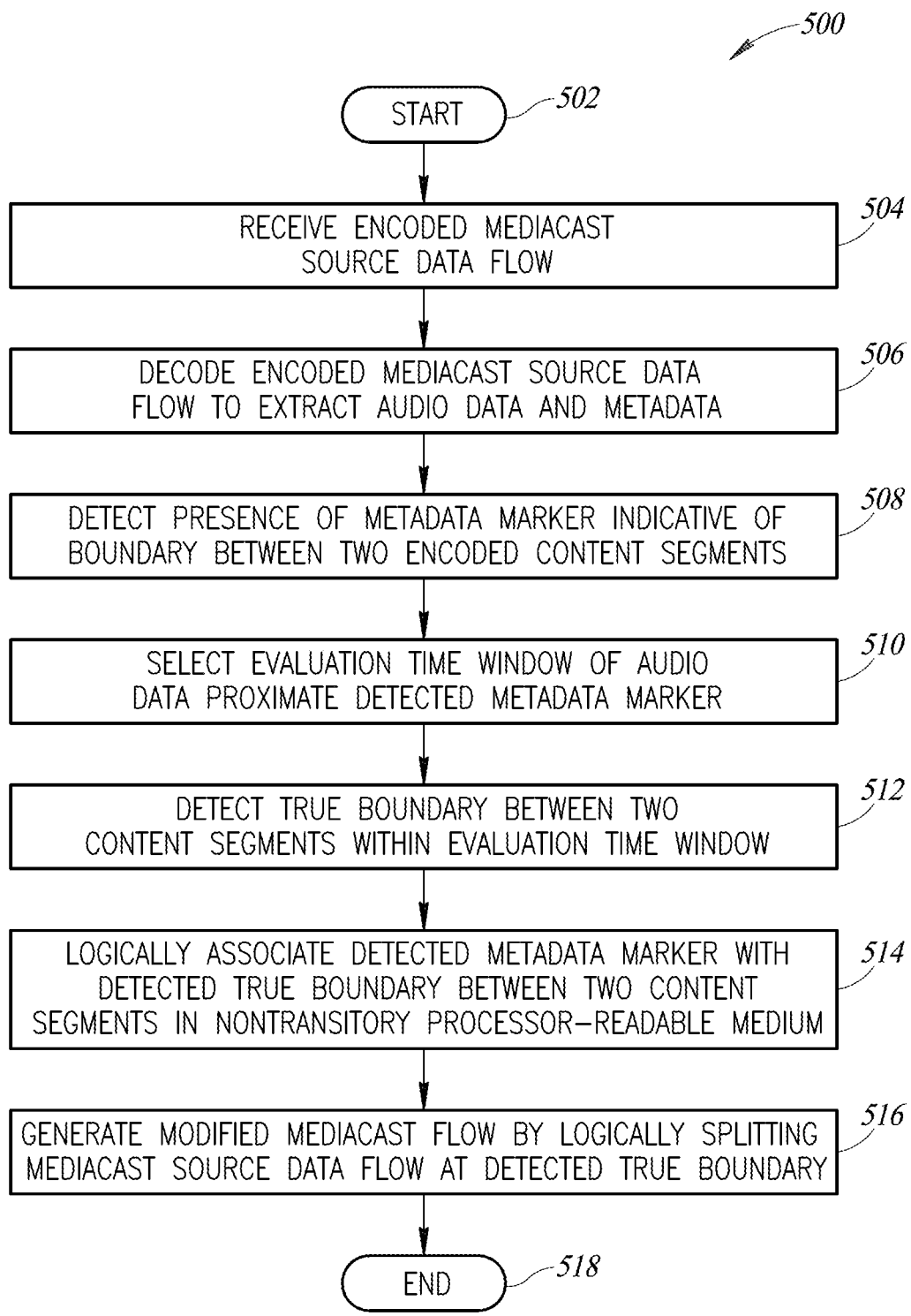
FIG. 5 is a flow diagram for a method of operating a mediacast generation system to determine a true boundary between content segments in a networked environment, according to one illustrated implementation.
Figure 7:
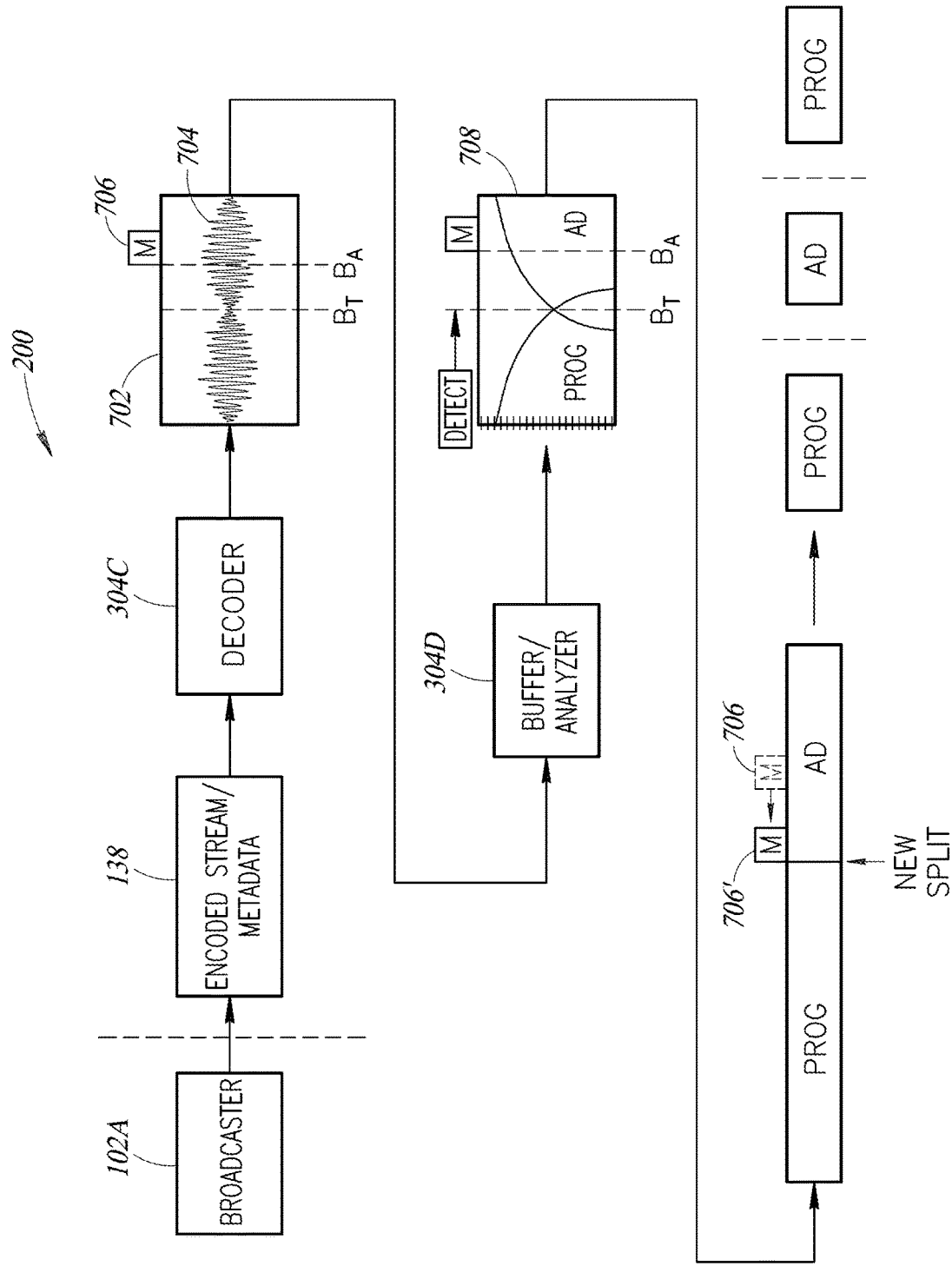

FIG. 5 shows a method 500 of operating one or more components of a mediacast generation system 116 (FIG. 1) to provide mediacasts 118 to mediacast content consumers 114 in a networked environment 100. FIG. 7 graphically shows the operation of some of the acts of the method 500 performed a decoder and a buffer/analyzer of the mediacast generation system 116. The method 500 starts at 502.

At 504, the mediacast generation system 116 receives the encoded stream 138 of content and metadata ("mediacast source data flow") from a broadcaster, such as the broadcaster 102A (FIG. 1). The encoded stream typically includes sequential replaceable and/or non-replaceable content segments, which may appear in any order. The mediacast source data flow may be encoded in any suitable format including, but not limited to, ICECAST, SHOUTCAST®, RealMedia®, Windows Media®, or QuickTime® format. As noted above, the encoded stream 138 may include in-band or out-of-band metadata markers which signify approximate boundaries between content segments. The metadata markers may be offset by a true boundary between content segments by a period of time (e.g., 0.5 seconds, 1 second, 3 seconds).

At 506, the mediacast generation system 116 decodes the encoded mediacast source data flow to extract the audio data and metadata therefrom. For example, as shown in the timing diagram 702 of FIG. 7, the decoder 304C (FIG. 3) may decode the audio stream data directly into Waveform Audio File Format (WAVE) data 704.

At 508, the mediacast generation system 116 detects the presence of a metadata marker indicative of a boundary between two content segments present in the encoded mediacast source data flow. For example, as shown in the timing diagram 702 of FIG. 7, the decoder 304C may detect a metadata marker 706 which signifies an approximate boundary $B_A$ between a first content segment and a second content segment present in the WAVE data.

At 510, the mediacast generation system 116 may select an evaluation time window of the audio data proximate the detected metadata marker 706. As a non-limiting example, the mediacast generation system 116 may select a window of one to five seconds before the detected metadata marker and one to five seconds after the metadata marker. The evaluation time window may be selected as a window of time proximate the metadata marker 706 wherein the true boundary between the content segments is likely to be found.

At 512, the mediacast generation system 116 may detect a true boundary $B_T$ between two content segments within the selected buffered evaluation time window. For example, as shown in a timing window 708 of FIG. 7, the buffer/analyzer 304D may utilize an amplitude analyzer (see FIG. 4) in the form of an envelope follower to measure the amplitude of the WAVE data. The buffer/analyzer 304D may identify a minimum amplitude within the evaluation time window as the true boundary $B_T$ between the two content segments present in the audio data. As shown in the timing diagram 708, the approximate boundary $B_A$ signaled by the metadata marker 706 is delayed from the detected true boundary $B_T$. In some implementations, the buffer/analyzer 304D may utilize a spectral analyzer (see FIG. 4) in addition to or instead of an amplitude analyzer to detect the true boundary $B_T$ between the two content segments.

At 514, the mediacast generation system 116 logically associates the detected metadata marker 706 with the detected true boundary $B_T$ between the two content segments in a nontransitory processor-readable medium. As shown in FIG. 7, the metadata marker 706 may be logically shifted in time to a point that corresponds with the true detected boundary between content segments. The shifted metadata marker is labeled metadata marker 706' in FIG. 7.

At 516, the mediacast generation system 116 generates a modified mediacast flow by logically splitting the mediacast source data flow at the detected true boundary $B_T$ between the content segments. The time corrected stream of data may be output to a fragment encoder (e.g., the fragment encoder 230 of FIG. 2), output to a transcoder (e.g., a 32 kbps transcoder), output to a file writer, etc. In some implementations, the output of the buffer/analyzer 304D may be forwarded to multiple components, for example, to form one or more transcoding or archiving systems.

The process 500 may terminate at 518 until called again, or may continually repeat. Additionally or alternatively, the process 500 may run concurrently with other methods or processes, for example, as one of multiple threads on a multi-threaded processor system.

While not illustrated in FIG. 5, the mediacast generation system 116 may optionally dynamically generate, or cause to be generated, a respective manifest for each request for a mediacast. The mediacast generation system 116 may additionally or alternatively, optionally fragment or cause to be fragmented the content constituting the mediacast. The mediacast generation system 116 may additionally or alternatively, optionally cause the fragments to be cached, for example by one or more CDNs 122 (FIG. 1).

The above description of illustrated implementations, including what is described in the Abstract, is not intended to be exhaustive or to limit the implementations to the precise forms disclosed. Although specific implementations and examples are described herein for illustrative purposes, various equivalent modifications can be made without departing from the spirit and scope of the disclosure, as will be recognized by those skilled in the relevant art. The teachings provided herein of the various implementations can be applied to other systems, not necessarily the exemplary system generally described above.

For instance, network and even non-networked topologies other than those illustrated and/or described may be employed. The mediacast generation system may be co-located with the broadcasters or Webcasters or located remotely from the broadcasters or Webcasters, or for example "in the cloud."

The implementations described herein can work with all current and future manifest protocols. Examples of current manifest protocols include M3U8 (Apple HLS), ISML (MSFT Smooth), F4M (Adobe "San Jose"). An example of a possible future manifest protocol includes MPEG DASH or other follow on iterations.

The mediacasts described herein may be transmitted or delivered to mediacast content consumers using a number of technologies including, but not limited to, Webcast, terrestrial broadcast, satellite broadcast, cable broadcast, multi-cast, or unicast.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various implementations described above can be combined to provide further implementations. To the extent that they are not inconsistent with the specific teachings and definitions herein, all of the U.S. patents, U.S. patent application publications, U.S. patent applications, foreign patents, foreign patent applications and non-patent publications referred to in this specification, including U.S. patent application Ser. No. 11/958,143, published as Publication No. 2008-0120638, U.S. patent application Ser. No. 13/679,828 filed Nov. 16, 2012; U.S. patent application Ser. No. 13/744,136 filed Jan. 17, 2013; U.S. patent application Ser. No. 13/711,984 filed Dec. 12, 2012; U.S. patent application Ser. No. 13/956,020 filed Jul. 31, 2013; U.S. patent application Ser. No. 14/485,416 filed Sep. 12, 2014; U.S. patent application Ser. No. 14/679,755 filed Apr. 6, 2015; and U.S. provisional patent application Ser. No. 62/172,693 filed Jun. 8, 2015, are incorporated herein by reference, in their entirety. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method of operation in a content management system, the content management system comprising at least one processor and at least one nontransitory processor-readable medium communicatively coupled to the at least one processor, the method comprising:

receiving, by the at least one processor, an encoded mediacast source data flow from one of a plurality of broadcasters or Webcasters over a data communications channel, the encoded mediacast source data flow comprises a plurality of encoded content segments each encoding at least audio data, the plurality of encoded content segments interspersed with a plurality of encoded metadata;

decoding, by the at least one processor, the encoded mediacast source data flow to extract the audio data and the metadata;

monitoring, in real-time by the at least one processor, the decoded mediacast source data flow to detect a switch between content types by attempting to detect a metadata marker in the mediacast source data flow, the metadata marker comprising in-band identifying metadata in the decoded mediacast data flow;

in response to the metadata marker being detected:
determining, by the at least one processor, an approximate boundary between two of the plurality of encoded content segments by associating the detected metadata marker with the approximate boundary between the two of the plurality of encoded content segments;
selecting, by the at least one processor, an evaluation time window of the audio data proximate the detected metadata marker;
detecting, by the at least one processor, a true boundary between two of the plurality of content segments within the evaluation time window of the audio data;
storing, by the at least one processor, a logical association between the detected metadata marker and the detected true boundary between the two of the plurality of content segments in the at least one nontransitory processor-readable medium, the logical association being a marker offset indicating a period of mistiming between the detected metadata marker and the detected true boundary; and
logically shifting, by the at least one processor, the detected metadata marker in time to a point that corresponds with the detected true boundary between the two of the plurality of content segments;

in response to the metadata marker not being detected:
utilizing, by the at least one processor, an original metadata split point as the detected true boundary between two of the plurality of content segments; and
generating, by the at least one processor, a modified mediacast flow by logically splitting the mediacast source data flow at the detected true boundary.

2. The method of claim 1 wherein detecting the true boundary between two of the plurality of content segments within the evaluation time window of the audio data comprises detecting amplitude variations of the audio data.

3. The method of claim 2 wherein detecting amplitude variations of the audio data comprises detecting amplitude variations utilizing an envelope follower.

4. The method of claim 1 wherein detecting the true boundary between two of the plurality of content segments within the evaluation time window of the audio data comprises detecting a period of low amplitude for the audio data within the evaluation time window.

5. The method of claim 1 wherein selecting an evaluation time window of audio data proximate the detected metadata marker comprises selecting an evaluation time window of audio data that extends at least from at least one second before the detected metadata marker to at least on second after the detected metadata marker.

6. The method of claim 1 wherein selecting an evaluation time window of audio data proximate the detected metadata marker comprises selecting an evaluation time window having a duration of at least ten seconds.

7. The method of claim 1 wherein selecting an evaluation time window of audio data proximate the detected metadata marker comprises selecting an evaluation time window that extends from a time before the detected metadata marker to a time after the detected metadata marker.

8. The method of claim 1 wherein receiving an encoded mediacast source data flow comprises receiving an encoded mediacast source data flow from a remotely located processor-based system associated with at least one of a plurality of mediacasters.

9. The method of claim 1 wherein receiving an encoded mediacast source dataflow comprises receiving a mediacast source data flow encoded in one of an ICECAST, SHOUTCAST®, RealMedia®, Windows Media®, or QuickTime® format, and decoding the encoded mediacast source data flow comprises decoding the encoded mediacast source data flow using an ICECAST, SHOUTCAST®, RealMedia®, Windows Media®, or QuickTime® encoder, respectively.

10. The method of claim 1, further comprising:
causing delivery of the modified mediacast source data flow over a network by at least one component of the content management system.

11. The method of claim 1, further comprising:
encoding the modified mediacast flow as content fragments; and
providing the content fragments to a number of content delivery networks for retrieval of the content fragments by content consumers.

12. A content management system, comprising:
at least one communications port communicatively coupleable to receive an encoded mediacast source data flow from a broadcaster or a Webcaster, the encoded mediacast source data flow comprising a plurality of encoded content segments each encoding at least audio data, the plurality of encoded content segments interspersed with a plurality of encoded metadata, at least some of the metadata including a metadata marker indicative of a presence of a boundary between two of the plurality of encoded content segments at a time proximate the metadata marker;
at least one nontransitory processor-readable medium which stores a number of processor-executable instructions; and
at least one processor communicatively coupled to the at least one communications port and communicatively coupled to the at least one nontransitory processor-readable medium to execute the processor-executable instructions, which execution causes the at least one processor to:
receive, via the at least one communications port, an encoded mediacast source data flow from the broadcaster or the Webcaster, the encoded mediacast source data flow comprises a plurality of encoded content segments each encoding at least audio data, the plurality of encoded content segments interspersed with a plurality of encoded metadata;
decode the encoded mediacast source data flow to extract the audio data and the metadata;
monitor, in real-time, the decoded mediacast source data flow to detect a switch between content types by attempting to detect a metadata marker in the mediacast source data flow, the metadata marker comprising in-band identifying metadata in the decoded mediacast data flow;
in response to the metadata marker being detected:
determine an approximate boundary between two of the plurality of encoded content segments by associating the detected metadata marker with the approximate boundary between the two of the plurality of encoded content segments;
select an evaluation time window of the audio data proximate the detected metadata marker;

detect a true boundary between two of the plurality of content segments within the evaluation time window of the audio data;

store a marker offset indicating a period of mistiming between the detected metadata marker and the detected true boundary between the two of the plurality of content segments in the at least one nontransitory processor-readable medium; and logically shift the detected metadata marker in time to a point that corresponds with the detected true boundary between the two of the plurality of content segments;

in response to the metadata marker not being detected:
utilize an original metadata split point as the detected true boundary between two of the plurality of content segments; and logically split the mediacast source data flow at the detected true boundary to generate a modified mediacast flow.

13. The content management system of claim 12 wherein the at least one processor:
detects amplitude variations of the audio data.

14. The content management system of claim 12 wherein the at least one processor:
detects amplitude variations utilizing an envelope follower.

15. The content management system of claim 12 wherein the at least one processor:
detects a period of low amplitude for the audio data within the evaluation time window.

16. The content management system of claim 12 wherein the at least one processor:
selects an evaluation time window of audio data that extends at least from at least one second before the detected metadata marker to at least on second after the detected metadata marker.

17. The content management system of claim 12 wherein the at least one processor:
selects an evaluation time window having a duration of at least ten seconds.

18. The content management system of claim 12 wherein the at least one processor:
selects an evaluation time window that extends from a time before the detected metadata marker to a time after the detected metadata marker.

19. The content management system of claim 12 wherein the at least one processor:
receives an encoded mediacast source data flow from a remotely located processor-based system associated with at least one of a plurality of mediacasters.

20. The content management system of claim 12 wherein the at least one processor:
receives a mediacast source data flow encoded in one of an ICECAST, SHOUTCAST®, RealMedia®, Windows Media®, or QuickTime® format, and decoding the encoded mediacast source data flow comprises decoding the encoded mediacast source data flow using an ICECAST, SHOUTCAST®, RealMedia®, Windows Media®, or QuickTime® encoder, respectively.

21. The content management system of claim 12 wherein the at least one processor:
causes delivery of the modified mediacast source data flow over a network via the at least one communications port of the content management system.

22. The content management system of claim 12 wherein the at least one processor:
encodes the modified mediacast flow as content fragments; and provides the content fragments to a number of content delivery networks for retrieval of the content fragments by content consumers.

* * * * *